(12) United States Patent
Takaoka et al.

(10) Patent No.: US 6,787,932 B2
(45) Date of Patent: Sep. 7, 2004

(54) POWER OUTPUT APPARATUS USING DIFFERENT TORQUE AND SPEED PATTERN CHARACTERISTICS AND CONTROL METHOD THEREOF

(75) Inventors: Toshifumi Takaoka, Susono (JP); Katsuhiko Hirose, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 85 days.

(21) Appl. No.: 09/770,198

(22) Filed: Jan. 29, 2001

(65) Prior Publication Data

US 2001/0017470 A1 Aug. 30, 2001

(30) Foreign Application Priority Data

Feb. 25, 2000 (JP) .......................................... 2000-048516

(51) Int. Cl.[7] .......................... F02M 11/06; H02P 9/04; B60K 1/00; B60K 6/00
(52) U.S. Cl. .................................... 290/40 C; 180/65.2
(58) Field of Search ........................ 290/40 C; 180/65.2

(56) References Cited

U.S. PATENT DOCUMENTS

| | | | | |
|---|---|---|---|---|
| 4,335,429 A | | 6/1982 | Kawakatsu | 364/424 |
| 5,656,921 A | | 8/1997 | Farrall | 322/40 |
| 5,740,669 A | * | 4/1998 | Kinugasa et al. | 60/285 |
| 5,804,934 A | * | 9/1998 | Yamada et al. | 318/34 |
| 5,867,009 A | * | 2/1999 | Kiuchi et al. | 180/165 |
| 5,908,453 A | | 6/1999 | Tabata et al. | 701/22 |
| 5,938,712 A | * | 8/1999 | Ibamoto et al. | 477/125 |
| 5,998,901 A | * | 12/1999 | Kawabata et al. | 310/103 |
| 6,158,822 A | * | 12/2000 | Shirai et al. | 188/1.11 L |
| 6,166,449 A | * | 12/2000 | Takaoka et al. | 290/40 A |
| 6,173,569 B1 | * | 1/2001 | Kusada et al. | 180/65.2 |
| 6,188,945 B1 | * | 2/2001 | Graf et al. | 180/65.2 |
| 6,209,672 B1 | * | 4/2001 | Severinsky | 180/65.2 |
| 6,278,195 B1 | * | 8/2001 | Yamaguchi et al. | 290/40 A |
| 6,321,530 B1 | * | 11/2001 | Hoshi et al. | 180/65.2 |

FOREIGN PATENT DOCUMENTS

| | | |
|---|---|---|
| DE | WO 99/62735 | 12/1999 |
| EP | 0 943 475 A2 | 9/1999 |
| JP | 07-322401 A | 12/1995 |
| JP | 9-58295 | 3/1997 |
| JP | 10-150701 A | 6/1998 |
| JP | 11-266507 | 9/1999 |

\* cited by examiner

*Primary Examiner*—Nicholas Ponomarenko
*Assistant Examiner*—Julio C. Gonzalez
(74) *Attorney, Agent, or Firm*—Oliff & Berridge, PLC

(57) ABSTRACT

A power output apparatus capable of generating power from at least an electric motor to a drive shaft includes a pattern storing unit that stores a plurality of output characteristic patterns in which power is generated to the drive shaft, a pattern selecting unit that selects one of the output characteristic patterns stored, and a drive controller that controls driving of the electric motor so that power that is within a range of the selected output characteristic pattern is generated to the drive shaft. The power output apparatus may also be controlled to operate the motor in a dash mode that allow motor output to exceed rated values for short periods of time to increase drivability.

13 Claims, 8 Drawing Sheets

POWER OUTPUT APPARATUS USING DIFFERENT TORQUE AND SPEED PATTERN CHARACTERISTICS AND CONTROL METHOD THEREOF

INCORPORATION BY REFERENCE

The disclosure of Japanese Patent Application No. 2000-048516 filed on Feb. 25, 2000 including the specification, drawings and abstract is incorporated herein by reference in its entirety.

BACKGROUND OF THE INVENTION

1. Field of Invention

The invention relates in general to a power output apparatus and a control method of the apparatus, and more particularly to a power output apparatus that is capable of generating power at least from an electric motor to a drive shaft, and a control method of the apparatus.

2. Description of Related Art

A known example of the above type of power output apparatus is disclosed in Japanese Patent Laid-Open Publication No. HEI 9-58295. The disclosed power output apparatus provides two or more torque patterns of an electric motor, from which one torque pattern is selected for driving the electric motor in a controlled manner. The power output apparatus is constructed such that power can be generated from an internal combustion engine and the electric motor to the drive shaft. The electric motor is operable to produce torque when the torque produced by the engine is insufficient, so as to achieve a currently required torque. More specifically, the power output apparatus stores two or more torque patterns, each of which indicates the output torque of the electric motor in percentage in relation to the accelerator position (i.e., an operation amount of the accelerator pedal), and drives the electric motor in a controlled manner by selecting one of the torque patterns.

However, the known power output apparatus does not take account of matching or balance between the output characteristics of the engine and those of the electric motor, and thus may not be able to exhibit appropriate or desired output characteristics. In particular, the known apparatus does not take energy efficiency into consideration, and therefore may exhibit poor energy efficiency depending upon the selected pattern.

SUMMARY OF THE INVENTION

It is an object of the invention to provide a power output apparatus capable of changing its output characteristics, and a control method thereof.

It is another object of the invention to provide a power output apparatus that assures enhanced driveability experienced by the driver, and a control method thereof.

It is yet another object of the invention to provide a power output apparatus that exhibits improved energy efficiency, and a control method thereof.

To accomplish the above and other objects, a first aspect of the present invention provides a power output apparatus operable to generate power from at least an electric motor to a drive shaft, which includes a pattern storing unit, a pattern selecting unit and a drive controller. The pattern storing unit stores a plurality of output characteristic patterns in which power is generated to the drive shaft, and a pattern selecting unit selects one of the output characteristic patterns stored in the pattern storing unit. The drive controller controls driving of at least the electric motor so that power that is within a range of the selected output characteristic pattern is generated to the drive shaft.

In the power output apparatus according to the first aspect of the invention, when the pattern selecting unit selects one from the plurality of output characteristic patterns of power generated to the drive shaft, the drive controller is operable to control driving of at least the electric motor so that power, as represented by the selected output characteristic pattern, is generated to the drive shaft. This makes it possible to cause the power output apparatus to generate power using a desired output characteristic pattern, thus assuring improved driveability experienced by the operator.

The power output apparatus according to the first aspect of the invention may further include an internal combustion engine operable to generate additional power to the drive shaft. In this case, the above-indicated drive controller controls driving of both the electric motor and the engine. Thus, the power as represented by the selected output characteristic pattern can be generated by controlling driving of the electric motor and the engine.

According to a second aspect of the invention, there is provided a power output apparatus operable to generate power from at least an electric motor to a drive shaft, which includes a command generating unit and a drive controller. The command generating unit generates a command to drive the electric motor with a driving characteristic that exceeds a rated value of the driving characteristic of the electric motor, and the drive controller controls driving of the electric motor. The drive controller is operable, in response to the command from the command generating unit, to control driving of the electric motor with the driving characteristic that exceeds the rated value for a limited period of time.

In the apparatus according to the second aspect of the invention, when a command to drive the electric motor with a driving characteristic that exceeds its rated value is generated, the drive controller operates to drive the motor with the driving characteristic exceeding the rated value, but for a limited period of time. Thus, the apparatus makes further use of the performance of the electric motor.

According to a third aspect of the invention, there is provided a control method of a power output apparatus operable to generate power from at least an electric motor to a drive shaft, comprising the steps of: (a) selecting one from a plurality of output characteristic patterns in which power is generated to the drive shaft; and (b) controlling driving of at least the electric motor so that power that is within a range of the selected output characteristic pattern is generated to the drive shaft. This control method makes it possible to generate power from the power output apparatus, using a desired output characteristic pattern, thus assuring improved driveability experienced by the operator.

According to a fourth aspect of the invention, there is provided a control method of a power output apparatus operable to generate power from at least an electric motor to a drive shaft, comprising the steps of: (a) generating a command to drive the electric motor with a driving characteristic that exceeds a rated value of the driving characteristic of the electric motor; and (b) controlling, in response to the command, driving of the electric motor with the driving characteristic that exceeds the rated value for a limited period of time. With this method, the power output apparatus is able to make further use of the performance of the electric motor.

DETAILED DESCRIPTION OF PREFERRED EMBODIMENT

Figure 1:
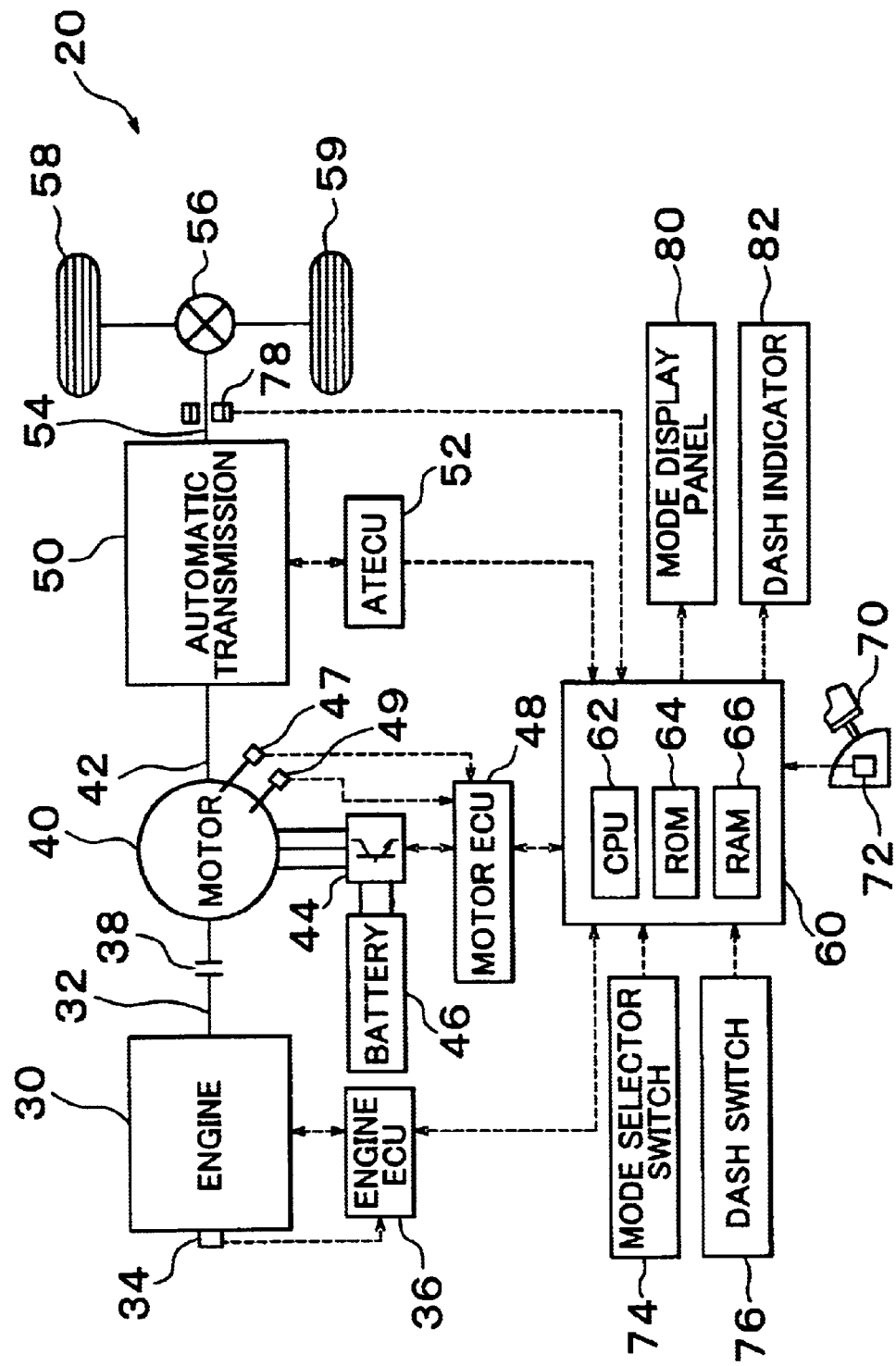
FIG. 1 is a schematic diagram illustrating a power output apparatus according to a preferred embodiment of the invention, which apparatus is installed in an automotive vehicle.

A presently preferred embodiment of the invention will be described with reference to the accompanying drawings. FIG. 1 schematically shows a power output apparatus 20 according to the preferred embodiment of the invention, which apparatus is installed in a vehicle. The power output apparatus 20 includes an engine 30 having a crankshaft 32, a motor 40 having a rotary shaft 42, and an automatic transmission 50 adapted to transmit the rotational motion of the rotary shaft 42 to a drive shaft 54 at a suitable speed ratio. The rotary shaft 42 of the motor 40 is connected to the crankshaft 32 of the engine 30 via a clutch 38. The apparatus 20 also includes an electronic control unit 60 for controlling the whole apparatus 20.

The engine 30, which is an internal combustion engine driven by a fuel such as gasoline, operates under control of an engine-controlling electronic control unit 36 (hereinafter referred to as an "engine ECU"). The engine ECU 36 includes a microprocessor including a central processing unit (CPU) as a main component (not shown). The engine ECU 36 receives output signals from various sensors relating to operating conditions of the engine 30, for example, an engine speed sensor 34 for detecting an engine speed Ne and a temperature sensor (not shown) for detecting an engine temperature. The engine ECU 36 controls the operation of the engine 30, more specifically, controls the fuel injection amount, flow rate of intake air and other parameters, on the basis of the received signals, so that the engine 30 generates power in accordance with a command from the electronic control unit 60.

The motor 40 is preferably a synchronous motor/generator that operates not only as an electric motor but also as an electric generator. The operation of the motor 40 is controlled by a motor-controlling electronic control unit 48 (hereinafter referred to as a "motor ECU"). The motor ECU 48 includes a microprocessor incorporating a central processing unit (CPU) as a main component (not shown). The motor ECU 48 receives output signals from various sensors relating to operating conditions of the motor 40, for example, a motor ammeter (not shown) for detecting an electric current applied to the motor 40, a temperature sensor 49 for detecting a motor temperature, and a motor speed sensor 47 for detecting a motor speed Nm. The motor ECU 48 controls the operation of the motor, more specifically, controls the current and voltage applied to the motor 40 on the basis of the received signals, so that the motor 40 generates power in accordance with a command from the electronic control unit 60. In this embodiment, the motor 40 supplies and receives electric power to and from a battery 46 via an inverter circuit 44. With this arrangement, the motor ECU 48 controls the motor 40 by selectively turning on and off six switching elements included in the inverter circuit 44.

The automatic transmission 50 generally includes a hydraulic torque converter, and a transmission including a plurality of planetary gear sets that provide multiple forward-drive gear positions, preferably five, and one backward-drive gear position. The automatic transmission 50 is driven under control of an AT-controlling electronic control unit 52 (hereinafter referred to as "ATECU"). The ATECU 52 includes a microprocessor incorporating a central processing unit (CPU) as a main component (not shown). The ATECU 52 receives signals from various sensors for detecting operating conditions of the automatic transmission 50, and operates to change or control the gear position of the automatic transmission 50 on the basis of the received signals. The gear position is changed by controlling a hydraulic circuit of the automatic transmission 50, more specifically, by selectively engaging or releasing a plurality of hydraulically operated clutches and brakes which are included in the hydraulic circuit.

Power generated by the engine 30 and the motor 40 in the above manner is transmitted to the drive shaft 54 via the automatic transmission 50 at a suitable speed ratio, and is finally output to the drive wheels 58, 59 via a differential gear device 56.

The electronic control unit 60 may be a microprocessor including a central processing unit (CPU) 62 as a main component, a ROM 64 for storing processing programs, a RAM 66 for temporarily storing data, an input/output port (not shown) and a communication port (not shown). The electronic control unit 60 receives various kinds of input signals via the input port. These input signals include an accelerator position AP received from an accelerator-position sensor 72 attached to an accelerator pedal 70, a mode signal received from a mode selector switch 74 disposed in the vicinity of a driver's seat for selecting a desired driving mode, an ON/OFF signal received from a dash switch 76 for generating a command to produce high torque only for a short period of time, and a speed of rotation (rotation speed) Nd of the drive shaft received from a drive shaft speed sensor 78 attached to the drive shaft 54, for example. The electronic control unit 60 generates, through an output port, a drive signal to a mode display panel 80 disposed in front of the driver for displaying a selected driving mode, an illuminating signal to a dash indicator 82 indicating whether the vehicle is able to dash or not, and other signals. The electronic control unit 60 communicates with the engine ECU 36, the motor ECU 48 and the ATECU 52 via the communication port.

Figure 2:
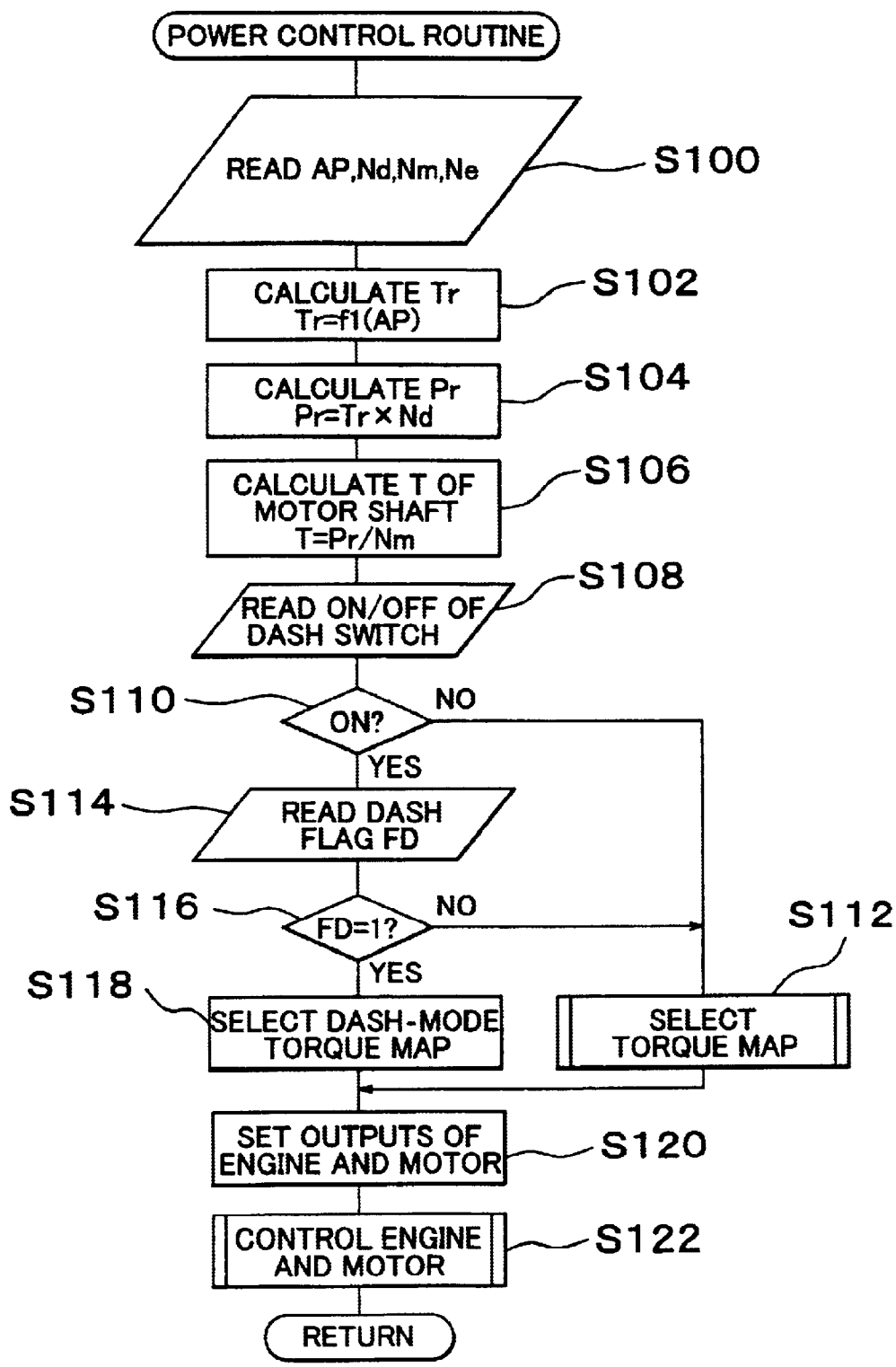
FIG. 2 is a flowchart showing a power control routine executed by an electronic control unit of the power output apparatus of FIG. 1.

Operation of the power output apparatus 20, especially the manner of controlling power generated by the apparatus, will be now described. The flowchart of FIG. 2 illustrates an example of a power control routine to be executed by the electronic control unit 60 of the power output apparatus 20 of the present embodiment. The power control routine is repeatedly executed at predetermined time intervals (e.g., every 8 msec.) once the power output apparatus 20 is started.

Figure 3:
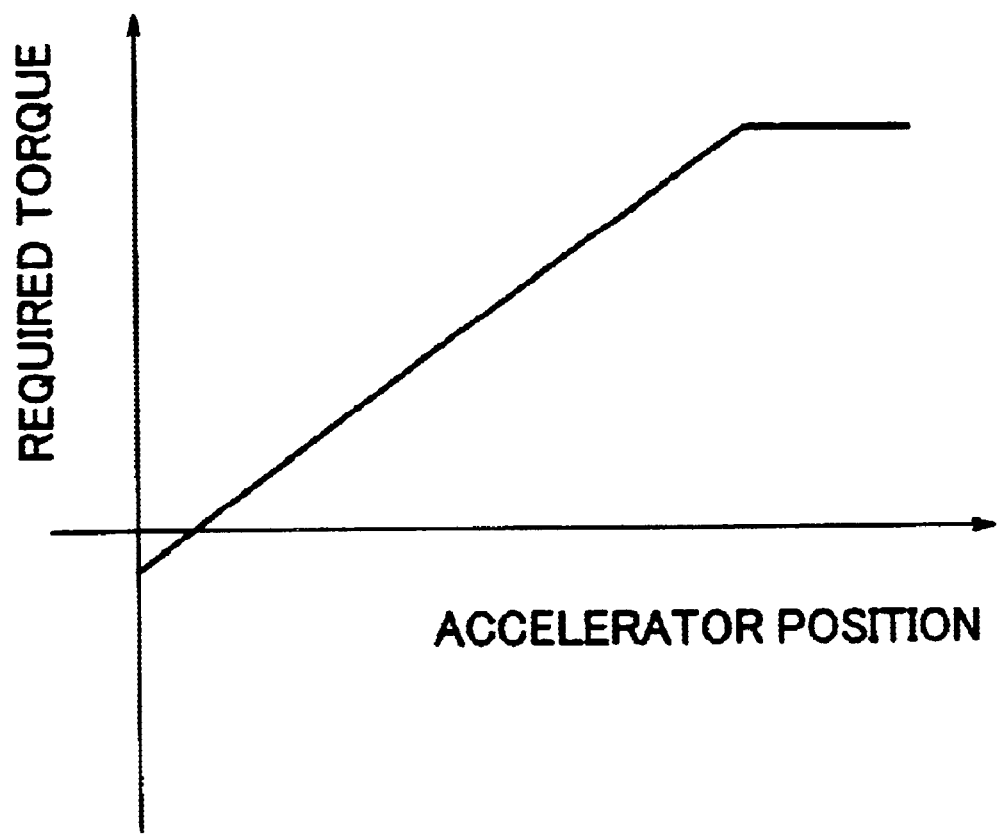
FIG. 3 is a graph showing an example of a map representing a relationship between required torque Tr and accelerator position AP.

Upon the start of the power control routine, the CPU 62 of the electronic control unit 60 executes step S100 to read an accelerator position AP detected by the accelerator position sensor 72, a rotation speed of the drive shaft Nd detected by the drive shaft speed sensor 78, a motor speed Nm detected by the motor speed sensor 47, and an engine speed Ne detected by the engine speed sensor 34. Step S102 is then executed to calculate a required torque Tr currently desired by the driver, based on the accelerator position AP read in step S100. The accelerator position AP represents an amount of depression of the accelerator pedal 70 by the driver. Since the depression amount of the accelerator pedal 70 represents the torque currently demanded by the driver, the required torque Tr can be calculated on the basis of the detected accelerator position AP. In the present embodiment, a map representing the relationship between the accelerator position AP and the required torque Tr as shown in FIG. 3 by way of example is stored in advance in the ROM 64. Upon receipt of an accelerator position AP, the CPU 62 obtains a required torque Tr corresponding to the received accelerator position AP from the map stored in the ROM 64.

Step S104 is then executed to calculate required power Pr by multiplying the obtained required torque Tr by the rotation speed Nd of the drive shaft. In step S106, the obtained required power Pr is divided by the motor speed Nm to obtain a torque T of the rotary shaft 42 of the motor 40. Although the power transmission efficiency of the automatic transmission 50 needs to be taken into consideration for actual calculation of the torque T based on the required power Pr, the efficiency is assumed to be 100% in this embodiment for the sake of simplicity of the explanation.

Step S108 is then executed to read an ON/OFF signal from the dash switch 76. At step S110 it is determined whether the dash switch 76 is ON. Control to be performed when the dash switch 76 is ON will be described later.

Figure 4:
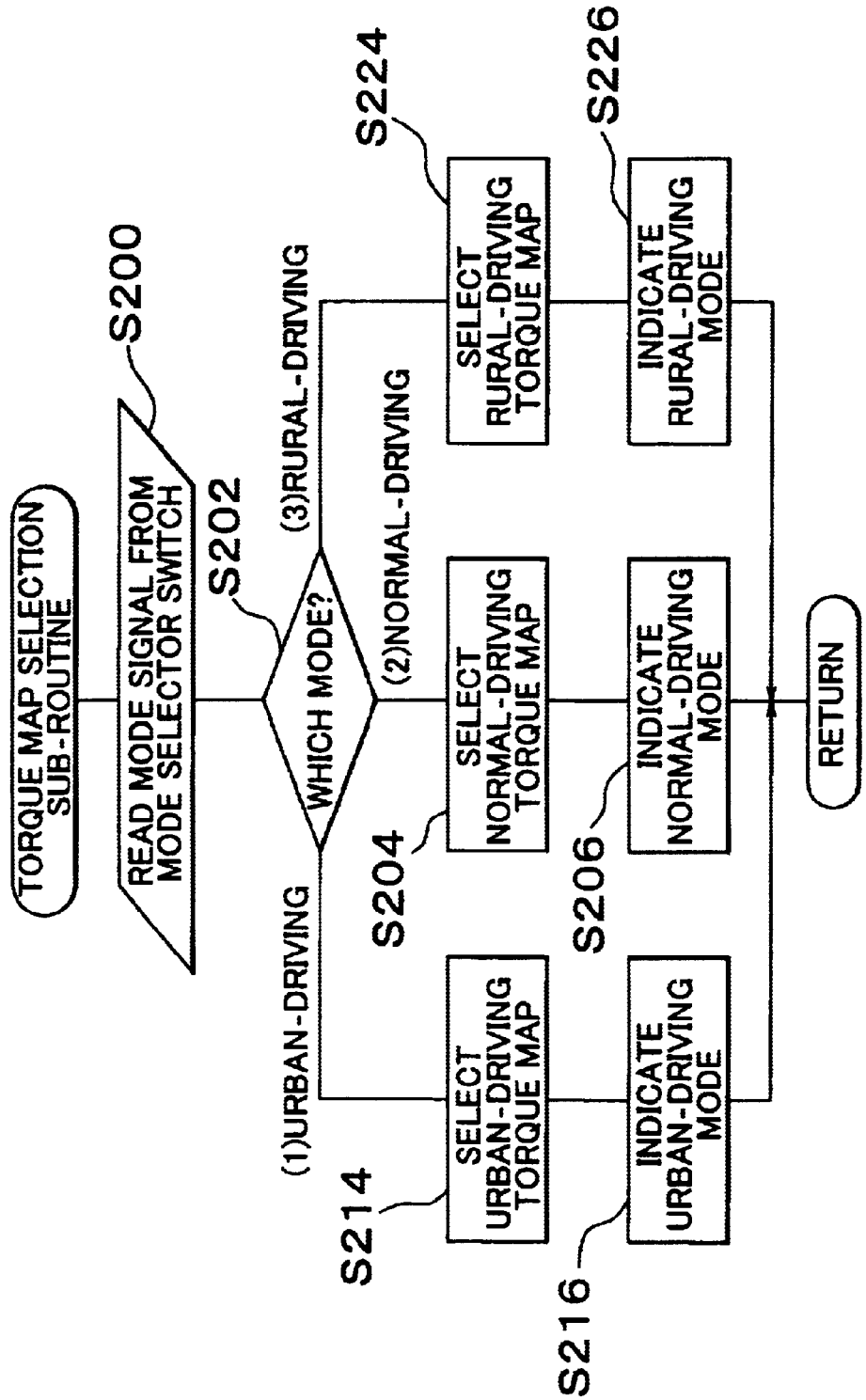
FIG. 4 is a flowchart showing a torque map selecting sub-routine executed by the electronic control unit of the power output apparatus of FIG. 1.

If step S110 determines that the dash switch 76 is OFF, the control flow proceeds to step S112 to select a suitable torque map that indicates torque to be applied to the drive shaft 54, by executing a torque map selection sub-routine as illustrated in the flowchart of FIG. 4 by way of example. Upon execution of the torque map selection sub-routine, the CPU 62 of the electronic control unit 60 initially executes step S200 to read a mode signal from the mode selector switch 74 which is manually operable by the driver, and proceeds to step S202 to determine which driving mode is currently selected. In a preferred embodiment, the driver is supposed to operate the mode selector switch 74 to select an appropriate one from three driving modes, namely, normal-driving mode, urban-driving mode and rural-driving mode. If the normal-driving mode is currently selected, the control flow proceeds to step S204 to select a normal-driving torque map, and then proceeds to step S206 to illuminate a location on the display panel 80 which corresponds to the normal-driving mode. If the urban-driving mode is currently selected, the control flow proceeds to step S214 to select an urban-driving torque map, and then proceeds to step S216 to illuminate a location on the display panel 80 which corresponds to the urban-driving mode. Likewise, if the rural-driving mode is currently selected, a rural-driving torque map is selected in step S224, and a location corresponding to the rural-driving mode is illuminated on the display panel 80 in step S226. This routine is terminated after executing any one of steps S206, S216 and S226.

Figure 5:
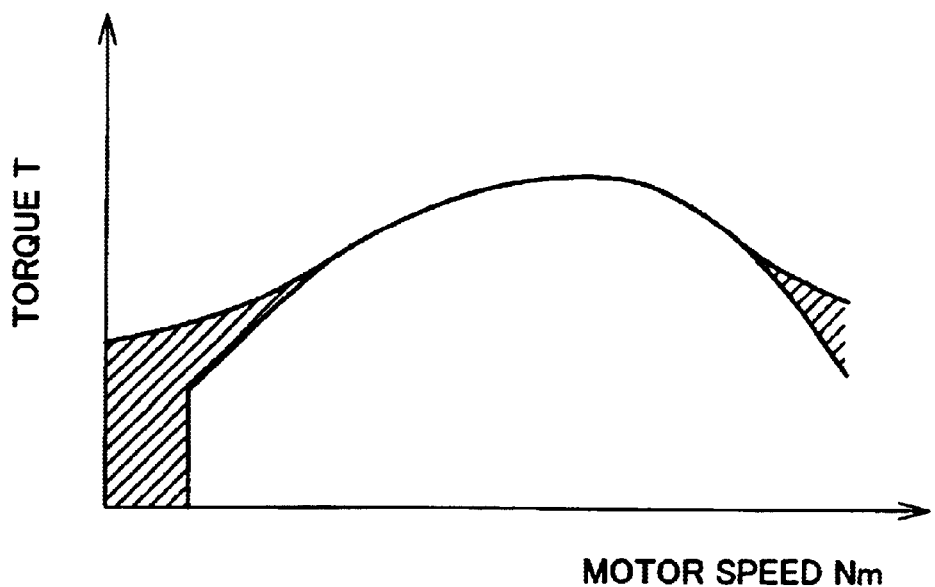
FIG. 5 is a graphical representation of an example of a normal-driving torque map.
Figure 6:
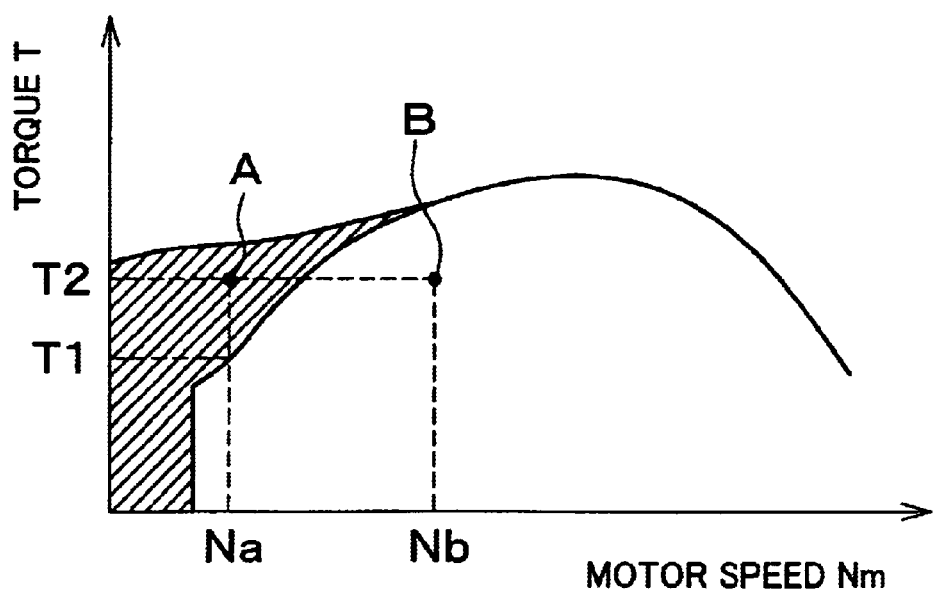
FIG. 6 is a graphical representation of an example of an urban-driving torque map.
Figure 7:
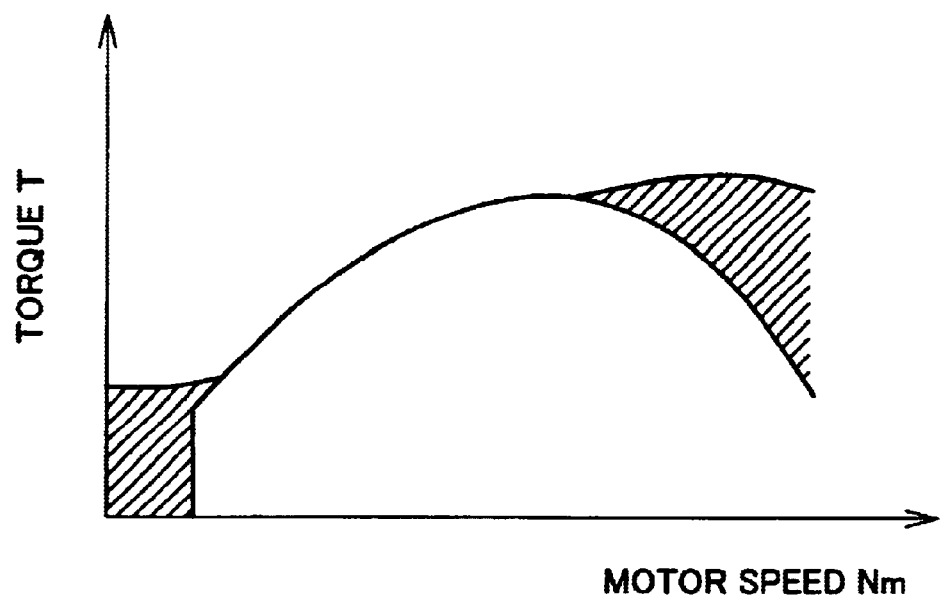
FIG. 7 is a graphical representation of an example of a rural-driving torque map.

FIG. 5 shows an example of normal-driving torque map, and FIG. 6 shows an example of urban-driving torque map, while FIG. 7 shows an example of rural-driving torque map. In each of these torque maps, a hatched region represents an output region of the motor 40, i.e., a region in which the torque is produced by the motor 40, and a non-hatched region represents an output region of the engine 30. At point "A" in the urban-driving torque map of FIG. 6, for example, the engine 30 is operated at an engine speed Na with torque T1, while the motor 40 is operated with a torque obtained by subtracting torque T1 from torque T2. At point "B", the engine 30 is operated at an engine speed Nb with torque T2, while the motor 40 is operated with its torque set to "0". It will be understood by comparing the torque maps of FIG. 5 to FIG. 7 that in the urban-driving torque map, a relatively large torque is generated from the motor 40 when the engine speed Ne is in a low revolution-speed region, and that in the rural-driving torque map, a relatively large torque is generated from the motor 40 when the engine speed Ne is in a high revolution-speed region. This difference arises from a difference between vehicle driving characteristics in an urban area and those in a rural area. As is understood from FIG. 5, the normal-driving torque map indicates intermediate characteristics between the urban-driving mode and the rural-driving mode.

Figure 8:
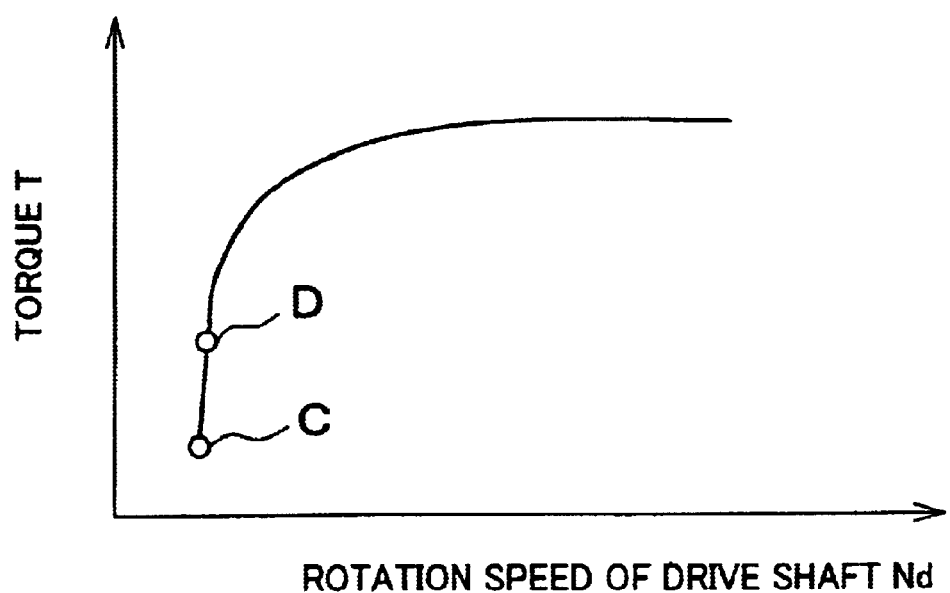
FIG. 8 is a graph useful for explaining the manner of changing a firing start point of the engine of the power output apparatus of FIG. 1.

When the urban-driving torque map is selected, control operations for reducing the load of the engine 30 and increasing regenerative electric energy obtained by the motor 40 are also performed. More specifically, the load of the engine 30 is reduced by shifting a firing start point of the engine 30 to a higher level. While the engine 30 is normally started when the power requested by the driver is equal to or higher than a predetermined value, the engine starting point is raised (or delayed) by raising the firing start point in the manner as shown in FIG. 8 by way of example. The firing start point of the engine 30 is set to point "C" in FIG. 8 when the normal-driving torque map or rural-driving torque map is selected. When the urban-driving torque map is selected, on the other hand, the firing start point is set to point "D" in FIG. 8. It is to be noted that power, which is represented by the product of the torque T and the rotation speed of the drive shaft Nd, is greater at point "D" than at point "C". When the urban-driving torque map is selected, the engine 30 starts firing at point "D" that provides larger power than point "C". Thus, the engine 30 does not start operating until relatively large power is required. Consequently, the load of the engine 30 is reduced. Furthermore, the quantity of regenerative electric energy from the motor 40 is increased by increasing regenerative braking force generated by the motor 40 when the brake pedal is depressed.

Referring back to the power control routine shown in FIG. 2, when the selection of the torque map is accomplished in step S112, the control flow proceeds to step S120 to set respective outputs of the engine 30 and the motor 40 on the basis of the selected torque map, motor speed Nm, and the torque T. For instance, when the urban-driving torque map is selected, and point "A" as shown in FIG. 6 indicates the current relationship between the motor speed Nm and the torque T, the output of the engine 30 is set to a level that is determined by the engine speed Na and torque T1, and the output of the motor 40 is set to a level that is determined by the current motor speed and a torque obtained by subtracting torque T1 from torque T2. When point "B" as shown in FIG. 6 indicates the current relationship between the motor speed Nm and the torque T, the output of the engine 30 is set to a level determined by the engine speed Nb and torque T2, while the output of the motor 40 is set to zero.

When the outputs of the engine 30 and the motor 40 are set as described above, the control flow advances to step S122 to control the engine 30 and the motor 40 so that the outputs set in step S120 are generated from the engine 30 and the motor 40. After step S122, the routine is then finished. In step S122, the engine 30 is controlled by the engine ECU 36 that receives a signal representing the output of the engine 30 from the electronic control unit 60 through communication, and the motor 40 is controlled by the motor ECU 48 that receives a signal representing the output of the motor 40 from the electronic control unit 60 through communication.

Figure 9:
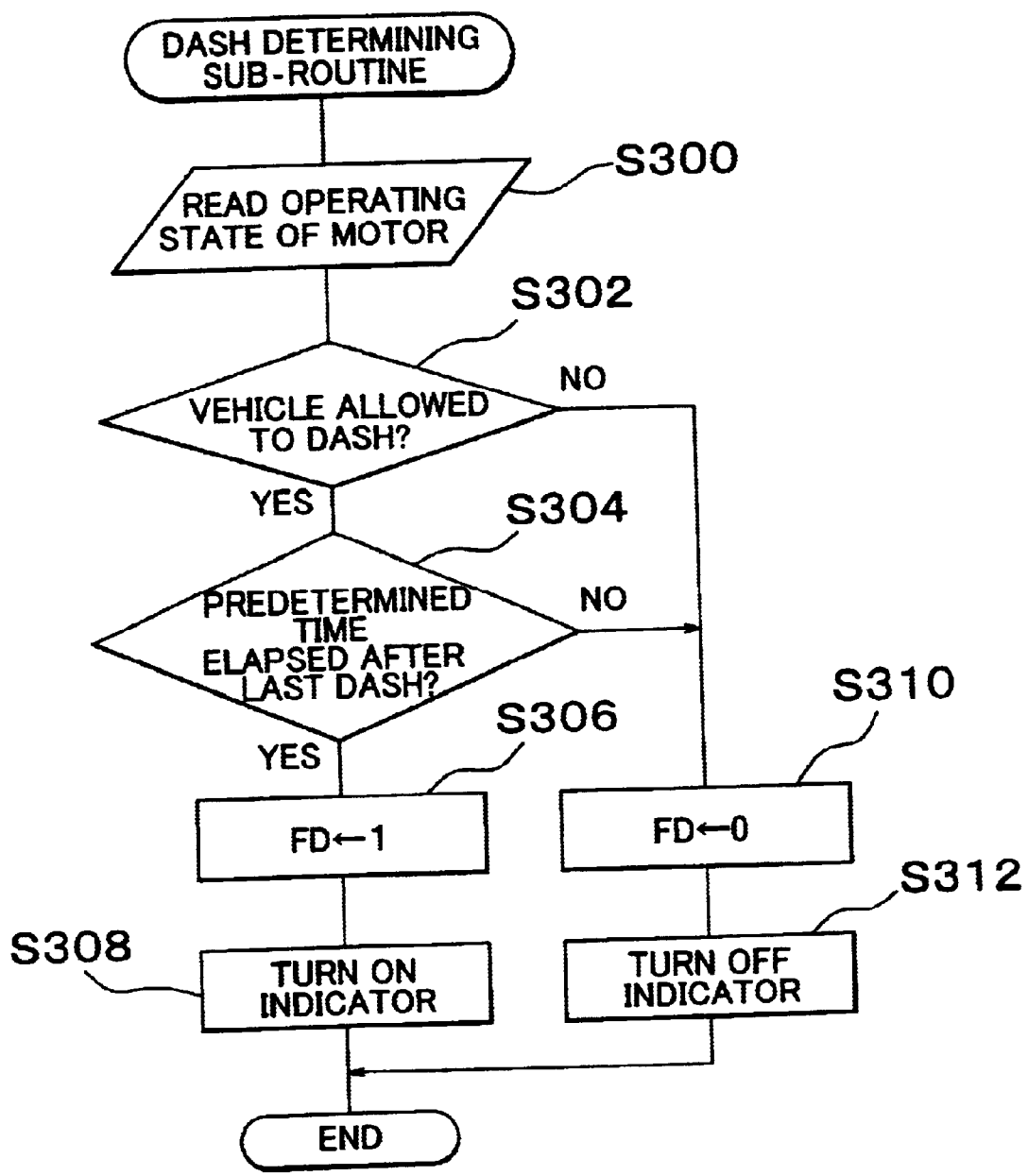
FIG. 9 is a flowchart showing a dash determining sub-routine executed by the electronic control unit of the power output apparatus of FIG. 1.

Referring back to FIG. 2 and the process when it is determined in step S110 that the dash switch 76 is ON, the control flow proceeds to step S114 to read a dash flag FD, and then proceeds to step S116 to determine the value of the dash flag FD. The dash flag FD is set by a dash determining sub-routine as illustrated in FIG. 9 by way of example, which will be hereinafter described. The dash determining sub-routine is executed repeatedly by the CPU 62 of the electronic control unit 60 at predetermined time intervals (e.g., every 8 msec.), immediately after the operation of the power output apparatus 20 of the embodiment is started.

Figure 10:
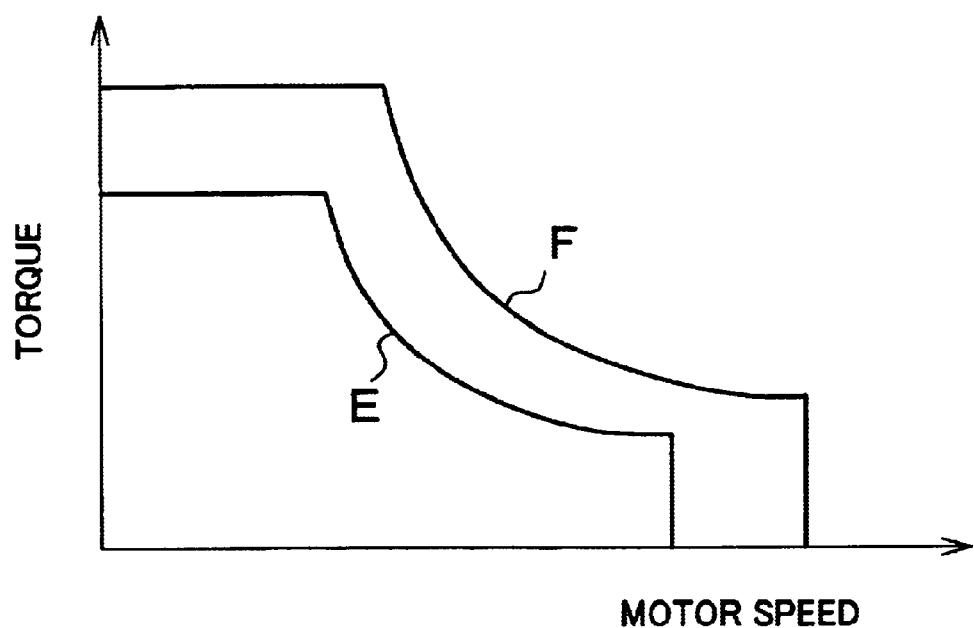
FIG. 10 is a graphical representation of an example of a relationship between a rated output of an electric motor and an output thereof which may exceed the rated output only for a short period of time.

Upon execution of the dash determining sub-routine, the CPU 62 of the electronic control circuit 60 executes step S300 to read the operating state or conditions of the motor 40. The operating conditions of the motor 40 include a motor speed Nm detected by the motor speed sensor 47, a motor temperature detected by the temperature sensor 49, electric current applied to the motor 40, and so forth. Step S302 is then executed to determine whether the vehicle is able to dash from the current operating state of the motor 40 read in step S300. More specifically, it is determined whether the motor 40 is able to generate output that is greater than the rated output. In general, an electric motor has a predetermined rated output, and is normally controlled to generate output that is equal to or less than the rated output. It is, however, possible to drive the motor with sufficient durability to generate output greater than the rated output provided that the driving of the motor in this mode is limited to a short period of time. FIG. 10 shows an example of the relationship between the rated output of the motor and the output that exceeds the rated output only for a short period of time. In the graph of FIG. 10, characteristic curve "E" represents the rated output, while characteristic curve "F" represents output which is greater than the rated power and which the motor is able to generate with sufficient durability only for a short period of time. It should be noted that the output in excess of the rated output and the period during which the motor can generate the output are determined depending upon the type of the motor in use.

If step S302 determines that the motor 40 is in an operating state that permits the vehicle to dash, the control flow proceeds to step S304 to check if a predetermined period of time has passed since the vehicle last performed a dashed operation. If it is determined that the predetermined time has passed, the control flow proceeds to step S306 to set the dash flag FD to "1", and then continues to step S308 to turn ON the dash indicator 82. After step S308, the routine is then terminated. With this arrangement, the driver can determine whether the vehicle is able to dash, depending upon whether the dash indicator 82 is ON or OFF, and operate the dash switch 76 based on the determination. In this control routine, whether the predetermined time has passed since the last dash of the vehicle is determined in order to prevent the output of the motor 40 from frequently exceeding the rated output even if the operating state of the motor 40 permits the vehicle to dash.

When step S302 determines that the motor 40 is not in an operating state that permits the vehicle to dash, or step S304 determines that the predetermined period of time has not yet passed, the control flow proceeds to step S310 to set the dash flag FD to "0". The control flow further proceeds to step S312 to turn off the dash indicator 82, and the control routine is finished.

Figure 11:
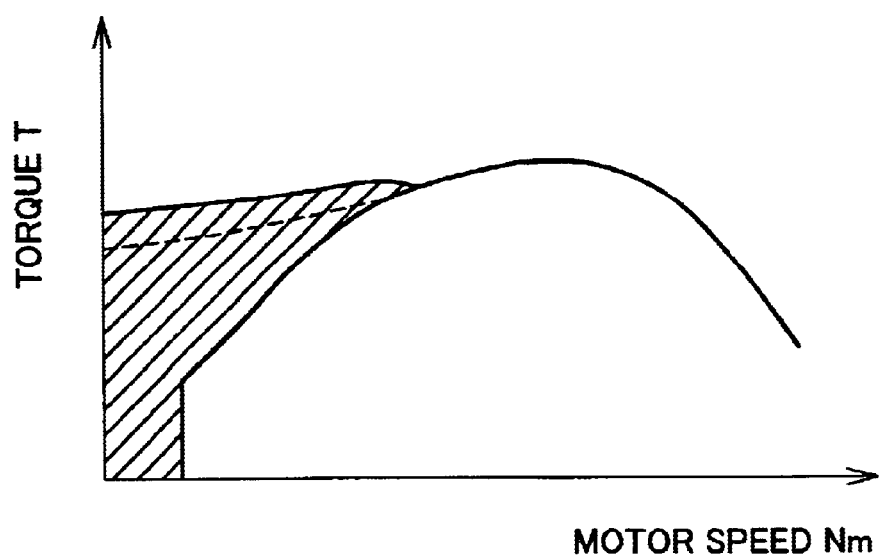
FIG. 11 is a graphical representation of an example of a dash-mode urban-driving torque map.

Referring back to the power control routine shown in FIG. 2, when it is determined in step S116 that the dash flag FD is set to "1", the control flow goes to step S118 to select an appropriate dash-mode torque map. FIG. 11 illustrates one example of a dash-mode urban-driving torque map, in which the broken line indicates the upper limit of the output of the motor 40 in the ordinary urban-driving torque map. As shown in FIG. 11, an extra region is added to the output region (hatched area) of the motor 40 of the urban-driving torque map. The extra region is set within a range in which the motor 40 can generate output exceeding its rated output only for a short period of time. A suitable dash-mode torque map is established by superposing an extra region on the torque map that is selected at the time when the dash switch 76 is turned ON. Namely, if the urban-driving torque map has been selected and the dash switch 76 is turned ON, the dash-mode urban-driving torque map as shown in FIG. 11 is selected. If the normal-driving torque map has been selected and the dash switch 76 is turned ON, a dash-mode normal-driving torque map (not shown) is selected in which an extra region is added to the motor output region of the normal-driving torque map. Likewise, if the rural-driving torque map has been selected and the dash switch 76 is turned ON, a dash-mode rural-driving torque map (not shown) is selected in which an extra region is added to the motor output region of the rural-driving torque map.

After selecting an appropriate dash-mode torque map in step S118, the control flow proceeds to step S120 to set the output of the engine 30 and the output of the motor 40 on the basis of the selected dash-mode torque map, the motor speed Nm, and the torque T. In step S122, the engine 30 and the motor 40 are controlled to generate the outputs determined in step S120. The power control routine is then finished. Even if step S110 determines that the dash switch 76 is ON, it is determined that the vehicle is not able to dash when the dash flag FD is equal to "0" ("NO" is obtained in step S116). In this case, the control flow proceeds to step S112 to select a torque map from ordinary normal-driving, urban-driving and rural-driving torque maps. Subsequently, step S120 is executed to set the respective outputs of the engine 30 and the motor 40, and step S122 is executed to control the engine 30 and the motor 40 based on the outputs set in step S122. The power control routine is then finished.

The power output apparatus 20 of the above-described embodiment is capable of generating power in accordance with a driving mode that is desired by the driver. Further, the power output apparatus 20 permits the motor 40 to generate an output that exceeds the rated output, but only for a limited short period of time. Consequently, the driveability of the vehicle can be improved. In addition, the power output apparatus 20 of the above embodiment is able to reduce the load of the engine 30 or increase the quantity of electric energy regenerated by the motor 40 when the urban-driving torque map is selected, thus assuring improved energy efficiency.

In the illustrated embodiment, the power output apparatus 20 is adapted to select a suitable driving mode of the vehicle from the normal-driving mode, the urban-driving mode and rural-driving mode. However, the power output apparatus of the invention is not limited to this and may be adapted to select a suitable driving mode, such as four or more different modes, or one or two modes. While a desired driving mode is selected from the driving modes stored in advance in the ROM 64 in the power output apparatus 20 of the illustrated embodiment, the driver or vehicle operator may be allowed to enter and register one or more driving modes as they wish, and select one from the driving modes thus registered.

According to the power output apparatus 20 of the present embodiment, the currently selected driving mode is visually indicated on the display panel 80. The currently selected mode may also be notified by means of a voice announcing system, or a suitable indicator that is to be turned on when the corresponding mode is selected.

While the motor 40 can be driven to provide the output exceeding the rated output when the dash switch 76 is turned on in the power output apparatus 20 of the illustrated embodiment, the motor 40 may be driven within the range of the rated output. In the power output device 20 of the illustrated embodiment, the selection of the dash-mode torque map is allowed upon or after a lapse of a predetermined period of time from the termination of the last dash of the vehicle. However, the torque map may be selected without taking account of the time elapsed after the last dash.

During running of the vehicle according to the urban-driving torque map in the illustrated embodiment, the power output apparatus 20 performs controls for decreasing the load of the engine 30 and for increasing the amount of regenerative electric energy obtained by the motor 40. However, the invention may also be applied to a power output apparatus that performs only one or neither of these control operations when the urban-driving mode is being selected.

In the power output apparatus 20 of the illustrated embodiment, the output values of the engine 30 and the motor 40 are respectively set according to a selected torque map in which the output region of the engine 30 and that of the motor 40 are set or defined. Alternatively, the torque map may be designed to define only the relationship between the motor speed and the maximum torque without including the output regions of the engine 30 and the motor 40, and the outputs of the engine 30 and the motor 40 may be set according to this torque map in view of the efficiencies of the engine 30 and motor 40, so as to maximize the overall efficiency of the power output apparatus. In this case, since the efficiency of the engine 30 is normally lower than that of the motor 40, the operating point of the engine 30 may be set so as to assure high efficiency of the engine 30 while adjusting the torque by means of the motor 40 so as to achieve a desired overall torque. In this manner, the energy efficiency of the apparatus as a whole can be further improved.

In the power output apparatus 20 of the illustrated embodiment, the torque map is set in accordance with the relationship between the motor speed Nm and the torque of the rotary shaft 42. It is, however, possible to set the torque map in accordance with the relationship between the rotation speed of the drive shaft Nd and the torque of the drive shaft 54.

In the power output apparatus 20 of the illustrated embodiment, the rotary shaft 42 of the motor 40 is connected to the engine 30 via the clutch 38, and is also connected to the drive shaft 54 via the automatic transmission 50. The power output apparatus of the invention may otherwise be provided without including, for example, the engine 30 or the automatic transmission 50. Further, the motor 40 may be directly connected to the drive shaft 54. Moreover, the motor 40 and the engine 30 may be electrically connected, or may be mechanically connected by means such as a planetary gear mechanism.

While the presently preferred embodiment of this invention has been described in detail for the illustrative purpose only, it is to be understood that the invention is not limited to the details of the illustrated embodiment, but may be otherwise embodied with various changes, modifications or improvements, without departing from the spirit and scope of the invention.

What is claimed is:

1. A power output apparatus operable to generate power from at least an electric motor to a drive shaft, comprising:
   a pattern storing unit that stores a plurality of output characteristic patterns in which the power is generated to the drive shaft, wherein an output characteristic pattern of the plurality of output characteristic patterns correlates between a motor speed and an output torque for supplying the power;
   a pattern selecting unit that selects one of said plurality of output characteristic patterns stored in the pattern storing unit;
   a drive controller that controls driving of at least the electric motor so that the power that is within a range of the selected output characteristic pattern is generated to the drive shaft; and
   a command generating unit that generates a command to drive the electric motor with a driving characteristic that exceeds a rated value of the driving characteristic of the electric motor;
   wherein the drive controller is operable, in response to the command from the command generating unit, to add a predetermined output to the selected output characteristic pattern, and control driving of the electric motor with the driving characteristic that exceeds the rated value for a limited period of time.

2. A power output apparatus according to claim 1, further comprising:
   a power demand receiving unit that receives a power demand that is currently desired by an operator;
   wherein the drive controller controls driving of at least the electric motor so that the desired power received by the power demand receiving unit is generated to the drive shaft.

3. A power output apparatus according to claim 1, further comprising:
   an internal combustion engine operable to generate additional power to the drive shaft;
   wherein said drive controller controls driving of both the electric motor and the engine.

4. A power output apparatus according to claim 3, further comprising:
   a power demand receiving unit that receives a power demand that is currently desired by an operator;
   wherein the drive controller controls driving of the electric motor and the engine so that the desired power received by the required power receiving unit is generated to the drive shaft.

5. A power output apparatus according to claim 4, wherein the drive controller controls the electric motor and the engine so that the requited power is generated and provided to the drive shaft with a high energy efficiency.

6. A power output apparatus according to claim 1, wherein the output characteristic patterns stored in the pattern storing unit include a low-revolution high-torque pattern in which a relatively high torque is produced in a low-revolution region of the drive shaft, and a high-revolution high-torque pattern in which a relatively high torque is produced in a high-revolution region of the drive shaft.

7. A power output apparatus according to claim 1, further comprising a selection output unit that outputs said one output characteristic pattern selected by the pattern selecting unit.

8. A power output apparatus according to claim 1, further comprising:
- a motor stare detector that detects an operating state of the electric motor; and
- a state determining unit that determines whether the electric motor can be driven with the driving characteristic that exceeds the rated value, based on the operating state detected by the motor state detector, wherein the drive controller performs control in response to the command from the command generating unit, depending upon a result of determination made by the slate determining unit.

9. A power output apparatus according to claim 8, further comprising a result output unit that outputs the result of determination made by the state determining unit.

10. A motor vehicle comprising the power output apparatus according to claim 1.

11. A power output apparatus operable to generate power from at least an electric motor to a drive shaft, comprising:
- a command generating unit that generates a command to drive the electric motor with a driving characteristic that exceeds a rated value of the driving characteristic of the electric motor, wherein the driving characteristic correlates between a motor speed and an output torque for supplying the power;
- a drive controller that controls driving of the electric motor, wherein the drive controller is operable, in response to the command from the command generating unit, to control driving of the electric motor with the driving characteristic that exceeds the rated value for a limited period of time;
- a motor state detector that detects an operating state of the electric motor; and
- a state determining unit that determines whether the electric motor can be driven with the driving characteristic that exceeds the rated value, based on the operating state detected by the motor state detector, wherein the drive controller performs control in response to the command from the command generating unit, depending upon a result of determination made by the state determining unit.

12. A power output apparatus according to claim 11, further comprising a result output unit that outputs the result of determination made by the state determining unit.

13. A motor vehicle comprising the power output apparatus according to claim 11.

* * * * *